United States Patent
Brust et al.

(10) Patent No.: US 8,348,411 B2
(45) Date of Patent: Jan. 8, 2013

(54) PIGMENT BASED INKS FOR RELIABLE HIGH SPEED INKJET PRINTING

(75) Inventors: Thomas B. Brust, Webster, NY (US); James W. Blease, Avon, NY (US)

(73) Assignee: Eastman Kodak Company, Rochester, NY (US)

( * ) Notice: Subject to any disclaimer, the term of this patent is extended or adjusted under 35 U.S.C. 154(b) by 572 days.

(21) Appl. No.: 12/570,288

(22) Filed: Sep. 30, 2009

(65) Prior Publication Data

US 2011/0076404 A1    Mar. 31, 2011

(51) Int. Cl.
*C09D 11/00* (2006.01)
(52) U.S. Cl. .................. 347/100; 347/95; 106/31.13
(58) Field of Classification Search ............ 347/95–100; 106/31.13, 31.6; 523/160, 161
See application file for complete search history.

(56) References Cited

U.S. PATENT DOCUMENTS

| | | | |
|---|---|---|---|
| 6,435,659 B1 | 8/2002 | Bruinsma et al. | |
| 6,607,268 B2 | 8/2003 | Bruinsma et al. | |
| 6,610,129 B1 | 8/2003 | Sader et al. | |
| 6,669,823 B1 | 12/2003 | Sarkas et al. | |
| 6,730,149 B2 | 5/2004 | Arita et al. | |
| 6,916,514 B2 | 7/2005 | Bringley et al. | |
| 7,101,528 B2 | 9/2006 | Martin et al. | |
| 7,370,952 B2 | 5/2008 | Inoue et al. | |
| 2003/0010252 A1* | 1/2003 | Arita et al. | 106/31.27 |
| 2004/0179066 A1* | 9/2004 | Arita et al. | 347/54 |
| 2008/0129811 A1 | 6/2008 | Tanaka et al. | |
| 2010/0055421 A1 | 3/2010 | Carmody et al. | |

FOREIGN PATENT DOCUMENTS

| | | |
|---|---|---|
| EP | 0 823 464 A1 | 2/1998 |
| EP | 1 022 151 A1 | 7/2000 |
| WO | WO 2009/035944 A2 | 3/2009 |

* cited by examiner

*Primary Examiner* — Matthew Luu
*Assistant Examiner* — Rut Patel
(74) *Attorney, Agent, or Firm* — Andrew J. Anderson

(57) ABSTRACT

An aqueous ink composition having at least one of dispersed pigments and anionic charged polymer, and further including a lower level, relative to the concentration of pigment and anionic charged polymer, of a polyvalent metal oxide particle dispersion, wherein the ink composition has a pH of greater than 4 and the polyvalent metal oxide particles have a negative zeta potential at the pH of the ink composition. These ink compositions are effective in reducing the damage and failure of silicon-based inkjet print heads caused by ink-induced dissolution and stress cracking of the silicon-based materials found in the print heads.

19 Claims, 1 Drawing Sheet

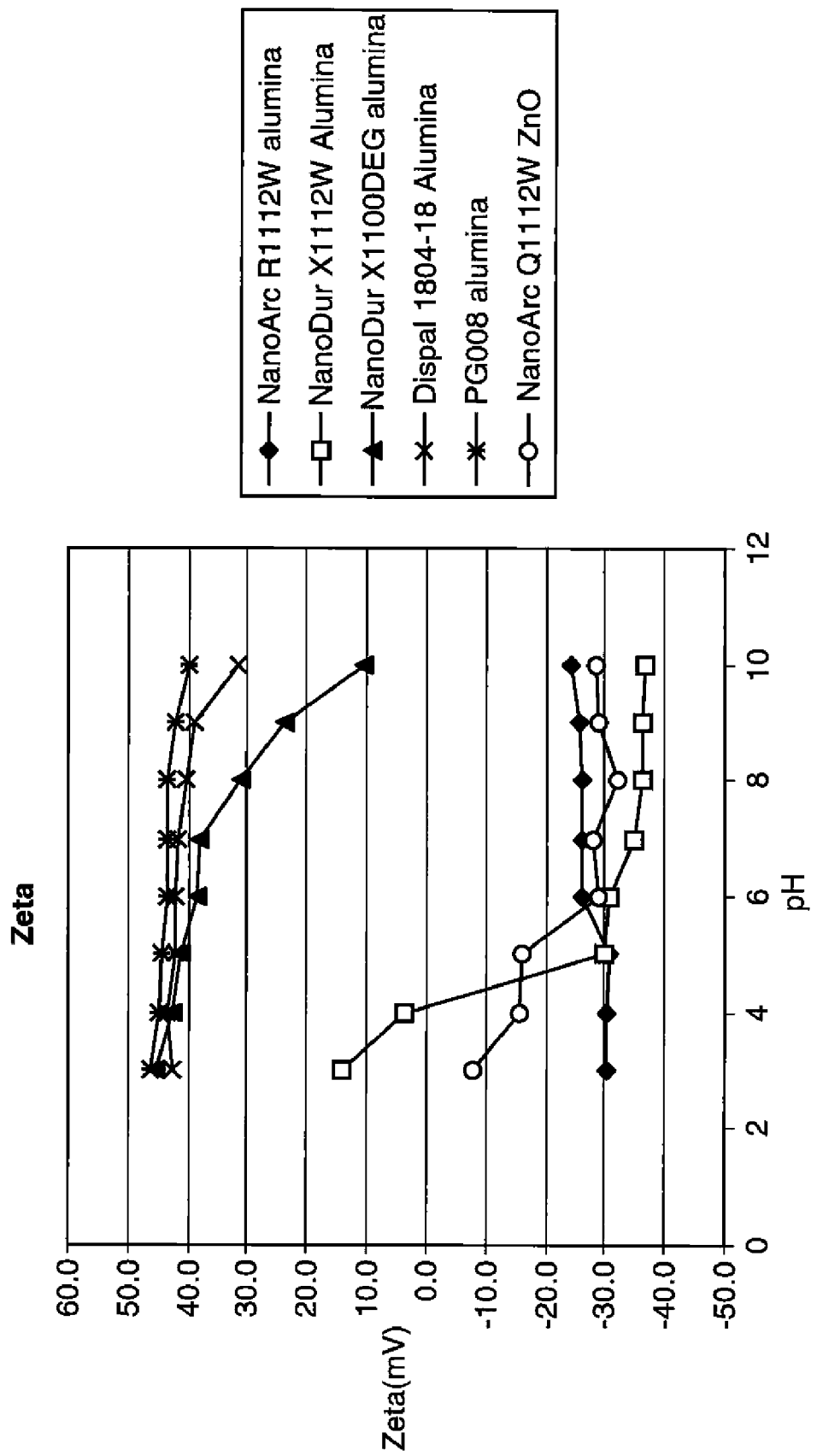

PIGMENT BASED INKS FOR RELIABLE HIGH SPEED INKJET PRINTING

FIELD OF THE INVENTION

The invention relates generally to the field of ink composition for inkjet printing, and to the related printing apparatus and materials that come in contact with the ink compositions whereby the print head is not damaged by contact with the ink.

BACKGROUND OF THE INVENTION

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand (DOD) inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught and recycled to an ink sump. Inkjet printers have found broad applications across markets ranging from desktop document and photographic-quality imaging, to short run printing and industrial labeling.

Most types of inkjet printers employ a printing head made from silicon-based materials including silicon, silicon dioxide, and silicon nitride because these materials are common in semiconductor fabrication facilities and can be readily processed to form highly complex integrated circuits and electromechanical devices. Parts of the print head including the printing nozzles as well as the channels that feed ink to the print head and printing nozzles often contain regions of these silicon-based materials that are in direct contact with the printing ink. It is well known in the art that a wide range of ink compositions can cause these silicon-based materials to dissolve or induce stress that results in mechanical failure and increased rates of dissolution (U.S. Pat. No. 6,730,149 B2). The reliability of the inkjet printing device can be dramatically reduced by these interactions between the ink and the silicon-based materials in the print head.

This problem has been difficult to solve. In some inkjet printing systems, the silicon-containing portions of the print head, in particular the ink chamber, the nozzles, and the ink channels were replaced along with the ink cartridge so that the lifetime of the silicon-based materials was limited to the lifetime of the individual ink cartridge. This approach dramatically increases the cost of the ink cartridge and limits the printing system design.

Another approach to preventing the ink from dissolving the silicon-based materials has been to coat or deposit a resistant material on all the surfaces that come in contact with the ink. These coatings can be either organic such as polymers or inorganic such as oxides of titanium or hafnium. This method also has the drawback of increasing the cost of the print head and often is also plagued by poor uniformity or pinholes in the coating that limit the protection from the ink.

There is a strong need for ink compositions that do not dissolve or damage the silicon-based materials in the print head.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment-based inks have a number of drawbacks. Great lengths must be undertaken to reduce a pigment to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

A second drawback of pigmented inks is their durability after printing, especially under conditions where abrasive forces have been applied to the printed image. Furthermore, the images printed onto an inkjet receiver are susceptible to defects at short time intervals, from immediately after printing to several minutes while the inks are drying. Finally, the durability of the dried image is also subject to environmental factors such as temperature and humidity which, under certain circumstances, can degrade image durability.

To this extent, pigmented inks have been formulated with various polymers, dispersants and other addenda in attempts to provide durable images that can withstand post printing physical abuse and environmental conditions.

A number of approaches to reducing the propensity of the ink to dissolve or damage the silicon-based print head materials have been disclosed. These methods typically involve controlling the alkali metal ion concentration, adding inhibiting organic molecules such as specific dyes, or adding cationic onium salts (U.S. Pat. No. 6,730,149 B2). Another approach employs dispersions of specific metal oxide particles such as alumina or cerium oxide where the particles have a positive charge in the pH range from 4 to 6 (US2008/0129811 A1) as characterized by their positive zeta potential in this pH range. These positively charged particles are believed to adhere to the negatively charge silicon-based surfaces in the print head and thereby eliminate the dissolution of these surfaces by the ink. These methods are limited to specific ink compositions and may not work well with pigment-based inks where a negative charge on the pigment surface and polymers is critical to the stability of the pigment dispersion and resulting ink. Another general approach to improving ink performance with regard to silicon corrosion is through adjustment of the ink pH value through the use of appropriate buffer solutions. For example, Inoue et al. in U.S. Pat. No. 7,370,952 B2 note that buffers can be used to adjust the pH values of inks used in drop-on-demand inkjet printers to reduce the effects of corrosion. This is primarily because the corrosion of silicon is known to be accelerated by higher pH value (more alkaline) solutions, such as those used in wet etching processes. At the same time, compositions useful to inkjet inks often require some alkalinity in order to maintain solution integrity, e.g., in order to prevent precipitation of ink components.

It has been found that low levels of some polyvalent metal ions such as aluminum can reduce the damage to the various materials in the print head (U.S. Pat. No. 6,607,268 B2)). If these ions can be effective at a low enough concentration so that they do not interact with other components of the ink, especially negatively charged pigments and polymers, these materials can be effective.

PROBLEM TO BE SOLVED BY THE INVENTION

Although addition of polyvalent metal ions can be effective at preventing damage to the silicon-based surfaces in the inkjet print head, most aqueous pigment-based inks contain large amounts of negatively charged pigments and polymers that will become unstable and precipitate at polyvalent metal ion concentrations greater than about 40 to 50 ppm. This can cause difficulty during ink manufacturing where great care must be taken during addition of the metal ion so that high local concentrations of ions are not present to cause destabilization of the pigment and polymers. It may also be required for long-term reliability of the printing system to have some ink formulations with polyvalent metal ion concentrations greater than can be stably obtained with metal ion salt additions.

SUMMARY OF THE INVENTION

In accordance with one embodiment, the invention is directed towards an aqueous ink composition comprising at least one of dispersed pigments and anionic charged polymer, and further comprising a lower level, relative to the concentration of pigment and anionic charged polymer, of a polyvalent metal oxide particle dispersion, wherein the ink composition has a pH of greater than 4 and the polyvalent metal oxide particles have a negative zeta potential at the pH of the ink composition. The size of the metal oxide particles preferably is less than 100 nm, more preferably less than about 50 nm, and may have a surface treatment that maintains the zeta potential in the desired range.

In accordance with a further embodiment, the invention is directed towards an inkjet system comprising a) a silicon-based printhead; and b) an aqueous ink composition comprising at least one of dispersed pigments and anionic charged polymer, and further comprising a lower level, relative to the concentration of pigment and anionic charged polymer, of a polyvalent metal oxide particle dispersion, wherein the ink composition has a pH of greater than 4 and the polyvalent metal oxide particles have a negative zeta potential at the pH of the ink composition.

In accordance with a further embodiment, the invention is directed towards a process for printing an aqueous ink composition with an inkjet printer comprising a silicon-based material which contacts the ink composition, comprising loading the printer with an aqueous ink composition and ejecting the ink composition, wherein the ink composition comprises at least one of dispersed pigments and anionic charged polymer, and further comprising a polyvalent metal oxide particle dispersion, wherein the ink composition has a pH of greater than 4, and the polyvalent metal oxide particles have a negative zeta potential at the pH of the ink composition and are present at a concentration sufficient to inhibit corrosion of the silicon-based material when contacted by the ink composition.

BRIEF DESCRIPTION OF THE DRAWINGS

FIG. 1 is a graph of Zeta potential of various nano aluminum oxide and nano zinc oxide particles as a function of pH.

DETAILED DESCRIPTION OF THE INVENTION

As an alternative approach to adding polyvalent metal ions in salt form to prevent print head damage, it has been found that addition of a relatively stable form of the metal in the form of metal oxide particles may be employed to release the metal ion at an adequate level to prevent print head damage, without the tendency to destabilize negatively charged pigment particles and polymers, where polyvalent metal oxide particles are employed which have a negative zeta potential at the pH of the ink composition.

Most particles in an aqueous environment have some surface charge that can cause particle repulsion and stabilize the particles from flocculation or agglomeration if the charge is large enough. Charged particles in an aqueous environment are often characterized by their movement in an electric field or electrokinetic behavior. Particles with a charged surface will attract ions of the opposite charge to the surface to form a double layer of charge that dissipates with distance into the surrounding bulk medium. This apparent charge is dependent on both the nature of the particle surface and the properties of the surrounding medium including pH, viscosity, and salt concentration. When the electrokinetic behavior is characterized, the velocity of the particles in an applied electric field are measured by light scattering. Using a simplified version of Henry's equation, the relationship between velocity and applied field can be reduced to a value known as the zeta potential, and represents the apparent charge at the point in the double layer where the fluid layer immediately surrounding the particle and the bulk fluid slip past each other as the particle moves in the applied electric field of the measuring device. Highly positive or negative zeta potential values typically greater than about + or −30 mV often correlate with a high degree of dispersion stability, while dispersions with lower values will show more tendency to flocculate and settle. The zeta potential is usually a function of the pH of the medium and at a specific pH the particles will exhibit a zeta potential of 0, commonly referred to as the isoelectric point.

Particles or different materials ranging from ceramics such as alumina to polymeric colloids or proteins will exhibit zeta potentials as a function of pH depending on the inherent molecular or atomic structure of the particles. Alumina particles have been extensively studied, and such particles typically have a positive zeta potential at pH values below their isoelectric point at a pH of 9. It is also well known, and often used in the ceramic industry, that the zeta potential of particles can be changed by surface treatments, such as by adsorbing molecules or polymers of different polarity or charge to the surface of the particles. For alumina, this can shift the zeta potential to a strongly negative value over a broad pH range. Various surface treatments of metal oxide particles to change the surface charge and zeta potential of such particles are known, e.g., treatment with polymers as described in U.S. Pat. No. 7,101,528, shelling with smaller sized particles as described in U.S. Pat. No. 6,916,514, and treatment with plasma as described in U.S. Pat. No. 6,669,823, the disclosures of which are incorporated by reference herein. Extremely fine dispersions of metal oxides such as alumina (e.g., NANOARC R1112W and NANODUR X1112W aluminas available from NanoPhase Technology) and zinc oxide (e.g., NANOARC Q1112W ZnO available from NanoPhase Technology) are available commercially in a form with a negative zeta potential over a wide range of pH above 4. These dispersions can be added to ink compositions containing negatively charged pigments and polymers with no significant destabilizing interaction. Small particles will slowly release the metal into the ink where it then can interact with the silicon-based materials to prevent dissolution and damage to the print head without destabilizing the pigment particles and negatively charged polymers.

The inkjet inks of the present invention are aqueous-based inks. By aqueous-based it is meant that the ink comprises mainly water as the carrier medium for the remaining ink components. In a preferred embodiment, the inks of the present invention comprise at least about 50-weight percent water. Pigment-based inks are defined as inks containing at least a dispersion of water-insoluble pigment particles. Dye-based inks are defined as inks containing at least a colored dye, which is soluble in the aqueous carrier. Colorless inks are defined as inks, which are substantially free of colorants such as dyes or pigments and as such, are not intended to contribute to color formation in the image forming process.

The ink compositions of the present invention contain low levels, relative to the colorant and polymer levels, of dispersions of metal oxides such as alumina and zinc oxide that have a negative zeta potential at a pH of greater than 4. These metal oxide dispersions may include a surface treatment or addenda such as a surfactant or polymer that provides a stable negative zeta potential to the particles over the pH range of interest. These metal oxide dispersions can be added to ink compositions containing negatively charged pigments and polymers with no significant destabilizing interaction. This is a significant advantage for preparation and manufacturing of the ink. Preferred levels of addition of such metal oxide particles is from 10 to 10,000 ppm, more preferably from 50 to 1000 ppm. While higher levels within such ranges are possible, generally levels below about 500 ppm are sufficient.

It is beneficial that the particles are small enough so that they have a high surface area and will slowly release the active metal ion into the ink where it then can interact with the silicon-based materials to prevent dissolution and damage to the print head without destabilizing the pigment particles and negatively charged polymers. The particle size preferably should be less than 100 nm, and more preferably less than or equal to about 50 nm.

Polyvalent metal oxide particles employed in the invention may contain aluminum or other polyvalent metal ions that can form metal oxide bonds with the silicon oxide or oxidized silicon surface that is less soluble or inhibits dissolution of the underlying silicon or silicon-oxide layer of the inkjet printer. Aluminum ion in particular has been found to be effective to inhibit aqueous dissolution of silicon oxide-based glass. Other polyvalent metal ions such as zinc, zirconium, hafnium, and titanium may also be useful.

An ink set is defined as a set of two or more inks. The ink sets may contain pigment-based inks of different colors, for example, cyan, magenta, yellow, red, green, blue, orange, violet or black. In one embodiment, a carbon black pigmented ink is used in an ink set further comprising at least three inks having separately, a cyan, a magenta and a yellow colorant. Useful ink sets also include, in addition to the cyan, magenta and yellow inks, complimentary colorants such as red, blue, violet, orange or green inks. In addition, the ink set may comprise light and dark colored inks, for example, light cyan and light magenta inks commonly used in the ink sets of wide format printers. It is possible to include one or more inks that comprise a mixture of different colored pigments in the ink set. An example of this is a carbon black pigment mixed with one or more colored pigments or a combination of different colored pigments. An ink set may also include one or more pigment-based inks in combination with one or more colorless inks. An ink set may also include at least one or more pigment-based inks in combination with additional inks that are dye-based inks.

The inks of the present invention preferably comprise pigment particles dispersed in the aqueous carrier. The dispersed pigment colorant preferably can be an anionic surfactant-dispersed pigment, self-dispersed anionic charged pigment colorant, or an anionic polymeric-dispersed pigment colorant. When the colorant is a surfactant-dispersed pigment colorant, the surfactant dispersant is preferably a metal salt of oleylmethyltaurate. The pigment particles that are useful in the invention may be prepared by any method known in the art of inkjet printing.

As noted, the inks of the invention may comprise self-dispersing pigments that are dispersible without the use of a dispersant. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include, but are not limited to, Cab-O-Jet® 200 and Cab-O-Jet® 300 (Cabot. Corp.) and Bonjet® Black CW-1, CW-2, and CW-3 (Orient Chemical Industries, Ltd.). In one embodiment, the invention is particularly suitable for use with anionic surface-treated self-dispersing pigments.

For pigments that require a dispersing agent, useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is preferably present in the milling step (a) in order to facilitate break up of the pigments into primary particles. For the pigment dispersion obtained in step (a) or the ink composition obtained in step (b), a dispersant is present in order to maintain particle stability and prevent settling. Small molecule surfactant dispersants such as a metal salt of oleylmethyltaurate as well as a polymeric dispersant may be employed. Polymeric dispersants are known and useful in aqueous pigment-based ink compositions. Polymeric dispersants may be added to the pigment dispersion prior to, or during the milling step. Typically, these polymeric dispersants are copolymers made from hydrophobic and hydrophilic monomers. Preferably, the hydrophilic monomers include anionic groups, such as (meth)acrylic acid monomers Examples of such polymers are described in US Publication No. 2007/0043144, which is incorporated by reference herein in its entirety.

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The pigment particles are preferably dispersed by a polymeric or small molecule dispersant in an amount sufficient to provide stability in the aqueous suspension and subsequent ink. The amount of dispersant relative to pigment is a function of the desired particle size and related surface area of the fine particle dispersion. It is understood that the amount of dispersant and relative ratios of the monomer constituents of a polymeric dispersant can be varied to achieve the desired particle stability and ink firing performance for a given pigment, as it is known that pigments can vary in composition and affinity for a polymeric dispersant.

The pigments used in the ink composition of the invention may be present in any effective amount, generally from 0.1 to 10% by weight, and preferably from 0.5 to 6% by weight, more preferably from 1 to 4% by weight.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 B2 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967B1. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632 B1. Colorless inks are also used to provide an overcoat to a printed image, usually in order to improve scratch resistance and waterfastness; see for example, US 2003/0009547 A1 or EP 1,022,151 A1. Colorless inks are also used to reduce gloss differential in a printed image; see for example, U.S. Pat. No. 6,604,819 B2; US 2003/0085974 A1; US 2003/0193553 A1; or US 2003/0189626 A1. In an embodiment, the present invention may be particularly useful for colorless inks comprising anionic charged polymers that may undesirably precipitate when exposed to multivalent metal ions when added as salt solutions.

Ink compositions useful in the invention can also comprise a humectant in order to achieve high frequency firing with low variability. Representative examples of humectants which may be employed in the present invention include; (1) triols, such as; glycerol, 1,2,6-hexanetriol, 2-ethyl-2-hydroxymethyl-propane diol, trimethylolpropane, alkoxylated triols, alkoxylated pentaerythritols, saccharides and sugar alcohols, (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol, or a mixture thereof. Typical aqueous-based ink compositions useful in the invention may contain 2-25 weight percent humectant(s), more preferably from about 6-20% humectant, most preferably from about 8-15% humectant.

The ink compositions of the present may also include, in addition to the humectant, a water miscible co-solvent or penetrant. Representative examples of co-solvents used in the aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (3) nitrogen-containing compounds such as urea, 2-pyrrolidinone, N-methyl-2-pyrrolidinone, and 1,3-dimethyl-2-imidazolidinone; and (4) sulfur-containing compounds such as 2,2'-thiodiethanol, dimethyl sulfoxide and tetramethylene sulfone. Typical aqueous-based ink compositions useful in the invention may contain 2-10 weight percent co-solvent(s).

Particular humectant and co-solvents useful in the present invention are 1,2-alkane diols (e.g. 1,2-hexane diol and 1,2-pentane diol) and lower alkyl glycol ethers (e.g. polyethyleneglycol monobutyl ether and diethyleneglycol monomethyl ether). These compounds are advantageous since inks formulated with the inventive polymeric dispersed pigments can provide increased density and reduced mottle when printed onto plain papers. This is an advantage over surfactant dispersed pigments or other polymeric dispersed pigments known in the art since these systems can be destabilized by the high surface activity of the 1,2 alkane diols or alkyl glycol ethers.

In another preferred embodiment, the components of the ink composition are selected such that the ink viscosity is less than about 4.0 centipoise at 25 degrees Celsius, more preferably less than about 3.0, even more preferably less than 2.5 and most preferably less than 2.0. Ink compositions defined by these preferred embodiments are capable of achieving high firing frequencies with low variability for a large number of firing events.

Surfactants may be added to adjust the surface tension of the ink to an appropriate level. In a particular embodiment, relative dynamic and static surface tensions of various pigment based inks and colorless protective ink of an ink set may be controlled as described in US 2008/0207805, the disclosure of which is incorporated by reference herein, to control intercolor bleed between the inks. In particular, where cyan, magenta, yellow, black and colorless inks are employed, the surface tensions of the inks may have the relationships wherein (i) the dynamic surface tension at 10 milliseconds surface age for all inks of the ink set is greater than or equal to 35 mN/m, (ii) the static surface tensions of the yellow ink and of the colorless protective ink are at least 2.0 mN/m lower than the static surface tensions of the cyan, magenta and black inks of the ink set, and (iii) the static surface tension of the colorless protective ink is at least 1.0 mN/m lower than the static surface tension of the yellow ink.

The surfactants may be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples of the above surfactants are described in "McCutcheon's Emulsifiers and Detergents: 1995, North American Editor".

A biocide (0.01-1.0% by weight) may also be added to prevent unwanted microbial growth which may occur in the ink over time. A preferred biocide for the inks employed in the present invention is Proxel® GXL (Zeneca Colours Co.) at a concentration of 0.05-0.1% by weight or/and Kordek® (Rohm and Haas Co.) at a concentration of 0.05-0.1% by weight (based on 100% active ingredient. Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Inorganic bases are preferred, however small amounts of organic bases, such as triethanolamine, may be used to adjust the pH of the ink. Useful inks may have a preferred pH of from about 4 to 10, depending upon the type of pigment being used. Preferably, the pH of the present ink is from 6 to 10, more preferably from 6 to 9, and most preferably from 7.5 to 9.0. To best accommodate such pH ranges, the polyvalent metal oxide particles preferably have a negative zeta potential over the entire pH range of from 5 to 10 or at least from 6 to 10.

The inks of the present invention can be printed through an inkjet printhead capable of achieving firing frequencies of at least 12 kHz with a near nozzle velocity of at least 10 meters/second. Any of the known printhead designs in the art of inkjet printing may be used which are capable of achieving these high speed firing frequencies. Preferably, the inkjet printer is equipped with a thermal inkjet printhead. Particularly preferred printhead designs are disclosed in US 2006/0103691 and US 2008/0137867, the disclosures of which are incorporated by reference herein.

Inks of the present invention may be applied to a photoglossy or plain paper receiver. The two types of receivers are distinguished from one another in that the photoglossy receiver is manufactured with a coated layer above the underlying paper support. Examples of plain papers include: Kodak bright white inkjet paper, Hewlett Packard Color inkjet paper, Xerox Extra Bright white inkjet paper, Georgia-Pacific inkjet Paper Catalog Number 999013, Staples inkjet paper International Paper Great White MultiUse 20 Paper, Xerox Premium Multipurpose Paper, Hammermill Copy plus or ForeMP paper, and Hewlett Packard Multipurpose paper. The plain papers may include papers that have been treated with multivalent salts during or after manufacture of the paper.

Inks of the present invention can be printed as digital images having photographic quality if a suitable recording medium, such as glossy inkjet paper, is used. Photoglossy receivers may be further categorized as being a swellable media (having a non-porous polymer coating) or a microporous media, although hybrid designs are also well known. The microporous media are typically comprised of a water-absorbing layer of fine particles or powders mixed with a polymeric hydrophilic binder to form a microporous structured coating. The particles or powders are typically polycrystalline inorganic materials such as boehmite alumina, porous and non-porous silicas (for example Sylojet or Ludox particles) or amorphous inorganic materials such as aluminum silicates. Microporous photoglossy media are preferred due to their relatively quick drying capabilities and improved water-fastness and smudge resistance compared to swellable media. The design of the both plain paper and photoglossy media vary widely depending on materials and paper manufacturing processes and should not be construed to limit the scope of the present invention.

The following examples illustrate, but do not limit, the utility of the present invention.

EXAMPLES

Acrylic Polymer AC1: A copolymer with 67 wt % benzylmethacrylate and 33% methacrylic acid was prepared as follows:

100 g of diethylene glycol (DEG) and 0.25 g of 2,2'-azobisisobutyronitrile (AIBN) are charged in a 1-liter, three-neck round-bottom flask equipped with a mechanical stirrer and nitrogen inlet. The resulting solution is purged with nitrogen for 20 minutes and heated to 150° C. in a constant temperature bath. In a separate vessel, 100 g of DEG, 0.25 g of AIBN, 33.5 g of benzyl methacrylate (BM), and 16.5 g of methacrylic acid (MA) are combined, mixed well, and added to the first solution over 2 hours. Polymerization continues for 3 hours. The temperature is then reduced to 65-70° C., and 1 mL each of t-butyl hydroperoxide (10 weight percent) and sodium formaldehyde bisulfite (10 weight percent) are added. The resulting polymer is isolated as a 20 wt. % aqueous solution by neutralizing the polymer to 70% of the stoichiometric acid number of 215 using potassium hydroxide. The resulting random copolymer of benzylmethacrylate and methacrylic acid is a 67/33-weight ratio with a weight average molecular weight of about 8000 and a number average molecular weight of about 5000.

Acrylic Polymer AC-2: A copolymer with 77.5 wt % benzylmethacrylate and 22.5% methacrylic acid was prepared as follows:

In a 1-liter, three-necked round-bottom flask equipped with a reflux condenser were mixed under nitrogen atmosphere 78 g of benzyl methacrylate, 22 g of methacrylic acid, 4.6 g of 1-dodecanethiol, and 400 mL of methyl ethyl ketone. The solution was stirred and purged with nitrogen for 20 minutes and heated to 70° C. in a constant temperature bath; 1.5 g. of Azobisisobutyronitrile (AIBN) was added. After 24 hours, the resulting solution was cooled. The resulting polymer solution was mixed with water and potassium hydroxide to achieve 85% acid neutralization. Thereafter the whole mixture was distilled at 50° C. under reduced pressure to remove the organic solvent. The final water-soluble polymer solution had a concentration of ca. 20 wt. % in water and its pH was ca. 8.5. The number average molecular weight was 4320 and the weight average molecular weight was 7160, and the acid number was 146.

Characterization of the Aluminum Oxide and Zinc Oxide Nanoparticles.

Zeta potentials for a variety of commercially available nano aluminum oxide (NANOARC R1112W, NANODUR X1112W, and NANODUR X1100DEG aluminas available from NanoPhase Technologies Corporation; DISPAL 1804-18 alumina available from Sasol North America Inc.; and CAB-O-SPERSE PG008 alumina available form Cabot Corp.) and nano zinc oxide (NANOARC Q1112W ZnO available from NanoPhase Technologies Corporation) particle dispersions were determined as a function of pH. FIG. 1 shows that the zeta potential of the aluminum oxide can be either positive or negative over most of the pH range typical for ink formulation. A zinc oxide particle with a negative zeta potential is also shown.

Pigment Ink Preparations

The following comparative and inventive inks were prepared. The pH of all inks prepared ranged from 8.0 to 9.0.

Ink Example I-1

(comparative): Into an approximately 500 ml high density polyethylene bottle without stirring, the following components were added in order: high purity water, 8 wt % of glycerol, 4 wt % of diethylene glycol, 4 wt % of 1,5-pentanediol, 0.4 wt % of triethanolamine, 0.4 wt % of the Tergitol 15-S-12 surfactant, 0.3 wt % of acrylic polymer AC-1, 0.1 wt % of acrylic polymer AC-2, 4.5 wt % of negatively charged self dispersed carbon black pigment CW3 as delivered from Orient Corporation of America, and 0.02 wt % of the biocide Kordek MLX. The mixture was stirred for 30 minutes and the resulting 500 g of ink were filtered with a 1.0 um disk filter. The pH of the ink was 8.6.

Ink Example I-2

(comparative): This ink was prepared identically to example I-1 except that before the self dispersed carbon black pigment was added to the ink mixture, a 5 wt % aluminum nitrate nonahydrate solution was added with stirring to the self dispersed pigment CW3 at a level adequate to achieve an aluminum ion concentration of 20 ppm in the final ink solution.

Ink Example I-3

(comparative): This ink was prepared identically to example I-1 except that before the self dispersed carbon black pigment was added to the ink mixture, a 5 wt % aluminum nitrate nonahydrate solution was added with stirring to the self dispersed pigment CW3 at a level adequate to achieve an aluminum ion concentration of 40 ppm in the final ink solution.

Ink Example I-4

(comparative): This ink was prepared identically to example I-1 except that before the self dispersed carbon black pigment was added to the ink mixture, a 1 wt % aluminum nitrate nonahydrate solution was added with stirring to the self dispersed pigment CW3 at a level adequate to achieve an aluminum ion concentration of 100 ppm in the final ink solution.

Ink Example I-5

Into an approximately 500 ml high density polyethylene bottle without stirring, the following components were added in order: high purity water, 8 wt % of glycerol, 4 wt % of diethylene glycol, 4 wt % of 1,5-pentanediol, 0.4 wt % of triethanolamine, 0.4 wt % of the Tergitol 15-S-12 surfactant, 0.3 wt % of acrylic polymer AC-1, 0.1 wt % of acrylic polymer AC-2, 4.5 wt % of self dispersed carbon black pigment CW3 as delivered from Orient Corporation of America, 0.02 wt % or 200 ppm of nanoparticulate aluminum oxide available from NanoPhase Technologies Corporation as NanoArc R1112W (20 nm particle size) and 0.02 wt % of the biocide Kordek MLX. The mixture was stirred for 30 minutes and the resulting 500 g of ink were filtered with a 1.0 um disk filter.

Ink Example I-6

Into an approximately 500 ml high density polyethylene bottle without stirring, the following components were added in order: high purity water, 8 wt % of glycerol, 4 wt % of diethylene glycol, 4 wt % of 1,5-pentanediol, 0.4 wt % of triethanolamine, 0.4 wt % of the Tergitol 15-S-12 surfactant, 0.3 wt % of acrylic polymer AC-1, 0.1 wt % of acrylic polymer AC-2, 4.5 wt % of self dispersed carbon black pigment CW3 as delivered from Orient Corporation of America, 0.05 wt % or 500 ppm of nanoparticulate aluminum oxide available from NanoPhase Technologies Corporation as NanoArc R1112W and 0.02 wt % of the biocide Kordek MLX. The mixture was stirred for 30 minutes and the resulting 500 g of ink were filtered with a 1.0 um disk filter.

Ink Example I-7

This ink was prepared identically to example I-5 except that before the self dispersed carbon black pigment was added to the ink mixture, a 5 wt % aluminum nitrate nonahydrate solution was added with stirring to the self dispersed pigment CW3 at a level adequate to achieve an aluminum ion concentration of 20 ppm in the final ink solution.

Ink Example I-8

This ink was prepared identically to example I-6 except that before the self dispersed carbon black pigment was added to the ink mixture, a 5 wt % aluminum nitrate nonahydrate solution was added with stirring to the self dispersed pigment CW3 at a level adequate to achieve an aluminum ion concentration of 20 ppm in the final ink solution.

Ink Example I-9

This ink was prepared identically to example I-7 except that the nanoparticulate aluminum oxide was replaced at equal level with nanoparticulate zinc oxide from NanoPhase Technologies Corporation as NanoArc Q1112W (20 nm particle size).

Ink Example I-10

This ink was prepared identically to example I-9 except that the level of nanoparticulate zinc oxide from NanoPhase Technologies Corporation as NanoArc Q1112W was increased to 0.05 wt % or 500 ppm.

Ink Example I-11

(comparative): Into an approximately 500 ml high density polyethylene bottle without stirring, the following components were added in order: high purity water, 5 wt % of glycerol, 15 wt % of diethylene glycol, 0.2 wt % of triethanolamine, 0.4 wt % of the Tergitol 15-S-12 surfactant, 0.3 wt % of acrylic polymer AC-1, 0.05 wt % of acrylic polymer AC-2, 4.5 wt % of self dispersed carbon black pigment CW3 as delivered from Orient Corporation of America, and 0.02 wt % of the biocide Kordek MLX and 0.02 wt % of a fumed alumina dispersion called CAB-O-SPERSE PG008 (approx. 130 nm particle size) available as a 40% aqueous dispersion from Cabot Corp. with a zeta potential of +46.3 to +39.7 over the pH range from 3 to 10 respectively as shown in FIG. 1. The mixture was stirred for 30 minutes and the resulting 500 g of ink were filtered with a 1.0 um disk filter.

Ink Example I-12

(comparative): This ink was prepared identically to I-11 except that the TEA level was increased to 0.4 wt %.

Ink Example I-13

(comparative): This ink was prepared identically to I-11 except that the fumed alumina dispersion was replaced with an equal concentration of a boehmite type alumina dispersion called Dispal 1804-80 (approx. 50 nm particle size) available from Sasol North America Inc. with a zeta potential ranging from 42.5 to 31.6 over the pH range from 3 to 10 as shown in FIG. 1 above.

Ink Example I-14

(comparative): This ink was prepared identically to 1-13 except that the TEA level was increased to 0.4 wt %.

Ink Example I-15

(comparative): This ink was prepared identically to I-11 except that the fumed alumina dispersion was replaced with an equal concentration of an alumina dispersion called NanoDur1100DEG (40 nm particle size) available from NanoPhase Technology with a zeta potential ranging from 45.2 to 10.3 over the pH range from 3 to 10 as shown in FIG. 1 above.

Ink Example I-16

(comparative): This ink was prepared identically to 1-15 except that the TEA level was increased to 0.4 wt %.

Ink Example I-17

(inventive): This ink was prepared identically to I-11 except that the fumed alumina dispersion was replaced with an equal concentration of an alumina dispersion called NanoDurX1112W (40 nm particle size) available from NanoPhase Technology with a zeta potential ranging from 14.0 to −36.8 over the pH range from 3 to 10 and a negative zeta potential at pH of 5 or greater as shown in FIG. 1 above.

Ink Example I-18

(inventive): This ink was prepared identically to 1-17 except that the TEA level was increased to 0.4 wt %.

Ink Example I-19

(inventive): This ink was prepared identically to I-11 except that the fumed alumina dispersion was replaced with an equal concentration of an alumina dispersion called NanoArcR1112W (20 nm particle size) available from NanoPhase Technology with a zeta potential ranging from −30.4 to −24.5 over the pH range from 3 to 10 as shown in FIG. 1 above.

Ink Example I-20

(inventive): This ink was prepared identically to 1-19 except that the TEA level was increased to 0.4 wt %.

Inks were evaluated for their ability to cause damage to a silicon-based print head by soaking three print head subassemblies composed of three integrated print head die containing two printing channels for each die. A total of 12 print head channels were evaluated for failure after 1 week of immersion in ink at 85° C. If the print head channels showed indication of breakage or delamination, it was considered damaged. Dispersion stability of the inks was also evaluated. Results are reported in Table I.

TABLE I

| Ink | Al + 3 ion level ppm | Al2O3 nanoparticle level - ppm | ZnO nanoparticle level - ppm | Nozzle plate damage |
|---|---|---|---|---|
| I-1 comparative | 0 | 0 | 0 | 100% |
| I-2 comparative | 20 | 0 | 0 | 17% |
| I-3 comparative | 40 | 0 | 0 | 8% |
| I-4 comparative | 100 | 0 | 0 | N.A. unstable dispersion |
| I-5 inventive | 0 | 100 | 0 | 17% |
| I-6 inventive | 0 | 250 | 0 | 8% |
| I-7 inventive | 20 | 100 | 0 | 0% |
| I-8 inventive | 20 | 250 | 0 | 0% |
| I-9 inventive | 20 | 0 | 200 | 0% |
| I-10 inventive | 20 | 0 | 500 | 0% |

Example I-4 in Table I shows that a level of aluminum ion higher than 40 ppm caused the carbon pigment dispersion to become unstable. Aggregates of larger particles rapidly settle out of the unstable ink, which would cause poor jetting and printing performance. The inventive examples employing addition of aluminum as nanoparticulate aluminum oxide show that much higher levels of aluminum can be added without degrading the jetting performance and providing even greater reduction of the damage to the nozzle plate and etching of the bare silicon in the ink channel. Table I also shows that the nanoparticulate zinc oxide with a negative zeta potential can also reduce the nozzle plate damage and silicon channel etching.

The inks I-11 through I-20 were evaluated for their ability to damage the nozzle plate by soaking 6 silicon-based print head subassemblies with a total of 36 ink channels in each ink at 85° C. for 94 hrs and 1 week. If any sign of breakage or delamination was observed, then that channel was considered failed.

Ink Example I-22

(inventive): This ink was prepared identically to 1-21 except that the alumina dispersion was replaced with an equal concentration of an alumina dispersion called X1112W (40 nm particle size) available from NanoPhase Technology which contains a proprietary dispersing agent that modifies the zeta potential of the alumina particles so values from −3.7 to −30.4 over the pH range from 3 to 10.

Ink Example I-23

(inventive): This ink was prepared identically to 1-21 except that the alumina dispersion was replaced with an equal concentration of an alumina dispersion called X1131W (20 nm particle size) available from NanoPhase Technology which contains a proprietary dispersing agent that strongly modifies the zeta potential of the alumina particles to very negative values from −22.8 to −48.9 over the pH range from 3 to 10.

TABLE II

| Ink | Alumina Dispersion | Zeta Potential Range pH 3 to 10 | Triethanol-amine level | Nozzle plate failure after 94 hrs at 85 C. | Nozzle plate failure after 1 week at 85 C. |
|---|---|---|---|---|---|
| I-11 comp. | PG008 | 46.3 to 39.7 | 0.2% | 39% | 97% |
| I-12 comp. | PG008 | 46.3 to 39.7 | 0.4% | 53% | 94% |
| I-13 comp. | DISPAL 1804-80 | 42.5 to 31.6 | 0.2% | 36% | 100% |
| I-14 Comp. | DISPAL 1804-80 | 42.5 to 31.6 | 0.4% | 44% | 100% |
| I-15 Comp. | NanoDur 1100DEG | 45.2 to 10.3 | 0.2% | 36% | 97% |
| I-16 Comp. | NanoDur 1100DEG | 45.2 to 10.3 | 0.4% | 47% | 100% |
| I-17 Inv. | NanoDur X1112W | 14.0 to −36.8 | 0.2% | 28% | 78% |
| I-18 Inv. | NanoDur X1112W | 14.0 to −36.8 | 0.4% | 3% | 50% |
| I-19 Inv. | NanoArc R1112W | −30.4 to −24.5 | 0.2% | 3% | 8% |
| I-20 inv. | NanoArc R1112W | −30.4 to −24.5 | 0.4% | 11% | 14% |

Table II shows that the alumina dispersions with a positive zeta potential at a pH of 4 or greater provide little or no protection from damage to the ink jet print head while the alumina dispersions with a negative zeta potential at pH above 4 are much more effective at reducing the nozzle plate failure during high temperature incubation tests.

Ink Example I-21

(comparative): Into an approximately 500 ml high density polyethylene bottle without stirring, the following components were added in order: high purity water, 5 wt % of glycerol, 15 wt % of diethylene glycol, 0.49 wt % of triethanolamine, 0.4 wt % of the Tergitol 15-S-12 surfactant, 0.3 wt % of acrylic polymer AC-1, 0.1 wt % of acrylic polymer AC-2, 4.5 wt % of self dispersed carbon black pigment CW3 as delivered from Orient Corporation of America, and 0.02 wt % of the biocide Kordek MLX and 0.02 wt % of an alumina dispersion called R1100W (40 nm particle size) from NanoPhase Technologies that has no added dispersing agent that modifies the zeta potential of the particles. Thus, these particles have a positive zeta potential ranging from 45.8 to 16.5 over the pH range from 3 to 10 respectively. The mixture was stirred for 30 minutes and the resulting 500 g of ink were filtered with a 1.0 um disk filter.

The inks in Table III were evaluated for their ability to cause print head damage by soaking the print head subassemblies in ink at 85 C and inspecting the subassemblies at approximately 100 hr intervals. Each subassembly is composed of three silicon-based integrated print head die containing two printing channels for each die for a total of 36 print head channels. By inspecting each subassembly at a specified time interval, failure growth curves were obtained and the time to 50% failure of the individual channels was determined. Comparative ink I-1 was re-evaluated using the failure growth curve method and included with inks I-21 through I-23 in table III.

TABLE III

| Ink | Aluminum source | Zeta Potential Range of alumina particle pH 3 to 10 | Time to 50% failure at 85 C. |
|---|---|---|---|
| I-1 comparative | none | N/A | 120 hrs |
| I-21 comparative | NanoPhase R1100W | 48.7 to 16.5 | 150 hrs |

TABLE III-continued

| Ink | Aluminum source | Zeta Potential Range of alumina particle pH 3 to 10 | Time to 50% failure at 85 C. |
|---|---|---|---|
| I-22 inventive | NanoPhase X1112W | −3.7 to −30.4 | 415 hrs |
| I-23 inventive | NanoPhase X1131W | −22.8 to −48.9 | 610 hrs |

The results in Table III show clearly that alumina particles with negative zeta potentials over a broad pH range show a much slower failure rate than alumina particles that contain no dispersing agent and therefore show a positive zeta potential. The failure rate of comparative ink I-21 is very similar to comparative ink I-1 that contained no aluminum source, suggesting that the alumina particles with a positive zeta potential are much less effective at stopping the print head damage.

Yellow Pigment-Based Ink Preparation
Yellow Pigment Dispersion Y-1:

A mixture of Pigment Yellow 155, potassium salt of oleylmethyl taurate (KOMT) and deionized water were charged into a mixing vessel along with polymeric beads having mean diameter of 50 mm, such that the concentration of pigment was 20% and KOMT was 25% by weight based on pigment. The mixture was milled with a dispersing blade for over 20 hours and allowed to stand to remove air. Milling media were removed by filtration and the resulting pigment dispersion was diluted to approximately 10% pigment with deionized water to obtain cyan pigment dispersion Y-1.

Polyurethane PU-1:

A 76 acid number polyurethane with a weight average molecular weight of 26,100 made with isophorone diisocyanate and a combination of 2000 Mw poly(hexamethylene carbonate)diol and 2,2-bis(hydroxymethyl)proprionic acid. The reaction was conducted in tetrahydrofuran (THF) at between 68° C. and 72° C. The complete reaction of the isocyanate was determined by infrared spectroscopy. The completed reaction mixture was diluted with water and 100% of the acid groups were neutralized with potassium hydroxide. The THF was stripped by vacuum evaporation.

Ink Example I-24

(comparative): Into an approximately 250 ml high density polyethylene bottle without stirring, the following components were added in order: high purity water, 10 wt % of glycerol, 2 wt % of ethylene glycol, 0.75 wt % of the Tergitol 15-S-5 surfactant, 1.6 wt % of polyurethane polymer PU-1, 1.5 wt % of acrylic polymer AC-2, 2.75 wt % of Yellow pigment dispersion Y-1 and 0.02 wt % of the biocide Kordek MLX. The mixture was stirred for 30 minutes and the resulting 250 g of ink were filtered with a 1.0 um disk filter.

Ink Example I-25

(inventive): This ink was prepared identically to 1-24 except that an alumina dispersion called NanoArcR1112W [(20 nm particle size) available from NanoPhase Technology with a zeta potential ranging from about −7 to about −25 over the pH range from 4 to 10 as shown in FIG. 1 above was added at a level to provide 20 ppm of aluminum in the ink.

Ink Example I-26

(inventive): This ink was prepared identically to 1-24 except that a zinc oxide dispersion called NanoArc Q1112W (20 nm particle size) available from NanoPhase Technology with a zeta potential ranging from about −7 to −30 over the pH range from 3 to 10 as shown in FIG. 1 above was added at a level to provide 30 ppm of zinc in the ink.

Ink Example I-27

(inventive): This ink was prepared identically to 1-24 except that both the alumina dispersion called NanoArcR1112W and the zinc oxide dispersion called NanoArc Q1112W were added at a levels to provide 20 ppm of aluminum and 30 ppm of zinc in the ink.

TABLE IV

| Ink | Nano- particulate metal dispersion | Level of metal in the ink | Nozzle plate failure after 3 week at 85 C. |
|---|---|---|---|
| I-24 comparative | none | 0% | 67% |
| I-25 inventive | Alumina as NanoArc R1112W | 20 ppm aluminum | 0% |
| I-26 inventive | Zinc oxide as NanoArc Q1112W | 30 ppm zinc | 0% |
| I-27 inventive | Alumina as NanoArc R1112W and Zinc oxide as NanoArc Q1112W | 20 ppm aluminum and 30 ppm zinc | 0% |

Table IV shows that the addition of metal oxide particles with a negative zeta potential at pH greater than 4 eliminates the damage to the print head caused by a colored pigment ink where the pigment is dispersed using a dispersing agent.

The invention claimed is:

1. An aqueous ink composition comprising at least one of dispersed pigments and anionic charged polymer, and further comprising a lower level, relative to the concentration of pigment and anionic charged polymer, of a polyvalent metal oxide particle dispersion, wherein the ink composition has a pH of greater than 4 and the polyvalent metal oxide particles have a negative zeta potential at the pH of the ink composition, and wherein the polyvalent metal oxide particles have a negative zeta potential over the entire pH range of from 6 to 10 and are present at a level of from 10 to 10,000 ppm.

2. The ink composition of claim 1, wherein the polyvalent metal oxide particles have a mean particle size of less than 100 nm.

3. The ink composition of claim 1, wherein the polyvalent metal oxide particles have a mean particle size of less than or equal to about 50 nm.

4. The ink composition of claim 1, wherein the polyvalent metal oxide particles comprise at least one of aluminum, zinc, zirconium, hafnium, or titanium.

5. The ink composition of claim 1, wherein the polyvalent metal oxide particles comprise at least one of aluminum or zinc.

6. The ink composition of claim 1, wherein the polyvalent metal oxide particles comprise aluminum.

7. The ink composition of claim 1, wherein the polyvalent metal oxide particles comprise alumina particles that have been surface treated to provide the negative zeta potential at the pH of the ink composition.

8. The ink composition of claim 1 wherein the ink composition has a pH of from 6 to 10, and the polyvalent metal oxide particles have a negative zeta potential for the entire pH range of from 5 to 10.

9. The ink composition of claim 1, wherein the ink composition has a pH of from 7.5 to 9, and the polyvalent metal oxide particles have a negative zeta potential for the entire pH range of from 6 to 10.

10. The ink composition of claim 1, comprising self-dispersed negatively surface charged pigment particles.

11. The ink composition of claim 1, comprising pigment particles dispersed with a negatively charged surfactant or polymeric dispersant.

12. The ink composition of claim 1, comprising a negatively charged polymer.

13. The ink composition of claim 1, wherein the polyvalent metal oxide particles are present at a level of from 50 to 1000 ppm.

14. An inkjet system comprising
a) a silicon-based printhead; and
b) an aqueous ink composition comprising at least one of dispersed pigments and anionic charged polymer, and further comprising a lower level, relative to the concentration of pigment and anionic charged polymer, of a polyvalent metal oxide particle dispersion, wherein the ink composition has a pH of greater than 4 and the polyvalent metal oxide particles have a negative zeta potential at the pH of the ink composition, and wherein the polyvalent metal oxide particles have a negative zeta potential over the entire pH range of from 6 to 10 and are present at a level of from 10 to 10,000 ppm.

15. The inkjet system of claim 14, wherein the polyvalent metal oxide particles comprise alumina particles that have been surface treated to provide the negative zeta potential at the pH of the ink composition.

16. The inkjet system of claim 14, wherein the aqueous ink composition comprises self-dispersed negatively surface charged pigment particles or pigment particles dispersed with a negatively charged surfactant or polymeric dispersant.

17. A process for printing an aqueous ink composition with an inkjet printer comprising a silicon-based material which contacts the ink composition, comprising loading the printer with an aqueous ink composition and ejecting the ink composition, wherein the ink composition comprises at least one of dispersed pigments and anionic charged polymer, and further comprising a lower level, relative to the concentration of pigment and anionic charged polymer, of a polyvalent metal oxide particle dispersion, wherein the ink composition has a pH of greater than 4, and the polyvalent metal oxide particles have a negative zeta potential at the pH of the ink composition and are present at a concentration sufficient to inhibit corrosion of the silicon-based material when contacted by the ink composition, and wherein the polyvalent metal oxide particles have a negative zeta potential over the entire pH range of from 6 to 10 and are present at a level of from 10 to 10,000 rpm.

18. The process of claim 17, wherein the polyvalent metal oxide particles are present at a level of from 50 to 1000 ppm and comprise alumina particles that have been surface treated to provide the negative zeta potential at the pH of the ink composition.

19. The process of claim 17, wherein the aqueous ink composition comprises self-dispersed negatively surface charged pigment particles or pigment particles dispersed with a negatively charged surfactant or polymeric dispersant.

* * * * *